United States Patent
Cully

(10) Patent No.: US 11,333,441 B2
(45) Date of Patent: May 17, 2022

(54) METHODS AND DEVICES FOR HEATING OR COOLING VISCOUS MATERIALS

(71) Applicant: NESTEC SA, Vevey (CH)

(72) Inventor: Kevin J. Cully, Chesterfield, MO (US)

(73) Assignee: SOCIÉTÉ DES PRODUITS NESTLÉ S.A., Vevey (CH)

( * ) Notice: Subject to any disclaimer, the term of this patent is extended or adjusted under 35 U.S.C. 154(b) by 202 days.

(21) Appl. No.: 16/354,966

(22) Filed: Mar. 15, 2019

(65) Prior Publication Data

US 2019/0212064 A1 Jul. 11, 2019

Related U.S. Application Data

(60) Continuation of application No. 14/992,630, filed on Jan. 11, 2016, now Pat. No. 10,274,260, which is a
(Continued)

(51) Int. Cl.
*F28D 9/00* (2006.01)
*A23L 13/60* (2016.01)
(Continued)

(52) U.S. Cl.
CPC .......... *F28D 9/00* (2013.01); *A22C 5/00* (2013.01); *A22C 7/00* (2013.01); *A23K 10/20* (2016.05);
(Continued)

(58) Field of Classification Search
CPC .... A22C 7/00; A22C 5/00; A23K 1/10; A23K 1/1853; A23L 1/317; A23L 13/60;
(Continued)

(56) References Cited

U.S. PATENT DOCUMENTS

| 1,967,837 A | 7/1934 | Naab |
| 2,315,768 A | 4/1943 | Burnette |
(Continued)

FOREIGN PATENT DOCUMENTS

| CN | 101203727 | 6/2008 |
| CN | 101562985 | 10/2009 |
(Continued)

OTHER PUBLICATIONS

Chinese Office Action for Application No. 201280046403.9 dated Aug. 4, 2015—17 pages.
(Continued)

*Primary Examiner* — Hong T Yoo

(57) ABSTRACT

Methods and devices heat or cool viscous materials, such as meat emulsions useful for producing food and other products. The devices include a heat exchanger including a first plate, a second plate attached to the first plate, and a first spacer and a second spacer arranged between the first plate and the second plate. The first plate, the second plate, the first spacer, and the second spacer define at least one temperature controlled passaged for a product to pass through the heat exchanger. The heat exchanger can be used in a system including one or more of a grinder, a mixing tank, an emulsifier device, a positive displacement pump, or a cutting device.

14 Claims, 4 Drawing Sheets

Related U.S. Application Data division of application No. 14/234,899, filed as application No. PCT/US2012/044933 on Jun. 29, 2012, now Pat. No. 9,232,814.

(60) Provisional application No. 61/574,156, filed on Jul. 28, 2011.

(51) Int. Cl.

| | |
|---|---|
| *A23K 10/20* | (2016.01) |
| *A23K 50/42* | (2016.01) |
| *A22C 7/00* | (2006.01) |
| *A22C 5/00* | (2006.01) |
| *F28D 21/00* | (2006.01) |

(52) U.S. Cl.
CPC .............. *A23K 50/42* (2016.05); *A23L 13/60* (2016.08); *F28D 2021/0042* (2013.01)

(58) Field of Classification Search
CPC .. F28D 2021/0042; F28D 9/00; F28D 9/0093; F28D 2021/0098; F28D 9/0031; F28D 9/0062; F28D 9/0081; F28D 9/083; F28D 9/0012; F28F 21/067; F28F 27/02; F28F 9/0219; F28F 9/26; F28F 2240/00; F28F 9/026; A23D 2021/0042; A28D 9/00; B01J 19/0013
See application file for complete search history.

(56) References Cited

U.S. PATENT DOCUMENTS

| | | | | |
|---|---|---|---|---|
| 4,442,886 | A * | 4/1984 | Dinulescu | F28D 9/0037 165/76 |
| 4,510,853 | A * | 4/1985 | Takagi | A47J 42/26 241/38 |
| 4,823,867 | A | 4/1989 | Pollard et al. | |
| 6,681,841 | B1 | 1/2004 | Dale | |
| 6,920,918 | B2 | 7/2005 | Knecht et al. | |
| 9,232,814 | B2 | 1/2016 | Cully | |
| 2006/0207245 | A1 | 9/2006 | Yamaguchi et al. | |
| 2007/0148323 | A1 | 6/2007 | Dingman et al. | |
| 2008/0078537 | A1 | 4/2008 | Cao | |
| 2009/0087355 | A1 * | 4/2009 | Ashe | F28F 27/02 422/600 |

FOREIGN PATENT DOCUMENTS

| | | |
|---|---|---|
| CN | 101563155 | 10/2009 |
| CN | 101711339 | 5/2010 |
| CN | 101886885 A | 11/2010 |
| JP | S5855685 | 4/1983 |
| JP | S62-37694 | 2/1987 |
| JP | 2004-028469 | 1/2004 |
| JP | 2006-057901 | 3/2006 |
| JP | 2008-540992 | 11/2008 |
| JP | 2011-512839 | 4/2011 |
| SU | 823808 | 4/1981 |
| SU | 1704615 | 1/1992 |
| WO | 2013015944 A2 | 1/2013 |

OTHER PUBLICATIONS

English Translation of Chinese Office Action for Application No. 201280046403.9 dated Aug. 4, 2015—15 pages.
Plates NPL.

* cited by examiner

METHODS AND DEVICES FOR HEATING OR COOLING VISCOUS MATERIALS

CROSS REFERENCE TO RELATED APPLICATIONS

This application is a Continuation of U.S. patent application Ser. No. 14/992,630 filed Jan. 11, 2016, now U.S. Pat. No. 10,274,260 which is a Divisional of U.S. patent application Ser. No. 14/234,899 filed Jan. 24, 2014, now U.S. Pat. No. 9,232,814 issued Jan. 12, 2016, which claims priority to PCT/US2012/044933 filed Jun. 29, 2012, which claims priority to U.S. Provisional Application Ser. No. 61/574,156 filed Jul. 28, 2011, the disclosure of each of which is incorporated herein by this reference in their entireties.

BACKGROUND

Field of the Invention

The invention relates generally to methods and devices for heating or cooling viscous materials and particularly to methods and devices for producing food products from meat emulsions.

Description of Related Art

Methods for producing meat emulsions and foods from such emulsions are known in the food industry. Meat emulsions are widely used in the production of products such as bolognas, frankfurters, sausages, animal foods, and the like.

Typically, meat emulsion products are prepared by mixing, chopping, and emulsifying a mixture of raw meat materials such as lean skeletal beef and pork, meat by-products, ice, salt, spices, and curing salts. The resulting emulsion contains fine fat particles coated with protein from the meat ingredients. For a sausage product, the resultant meat emulsion is then stuffed into a suitable casing that serves as a processing mold. The casing is then heated at increasing temperatures, for example 55° C. to 77° C., for extended periods, which may vary between 1 to 8 hours or more, depending on the volume of meat emulsion being processed.

The heating of the meat emulsion causes the protein contained therein to coagulate or to set solid. This thereby entraps the fat particles in the protein matrix thereby forming a firm meat emulsion product. The resultant meat emulsion product is a uniform, homogeneous mass that contains no discrete particles of meat and retains the shape of the casing when set.

To reduce the cost of certain food products to consumers, there has been a demand, in recent years, for meat emulsion products that resemble chunks or pieces of natural meat in appearance, texture, and physical structure, i.e., meat analogs. Such products are used as a partial or complete replacement for more expensive natural meat chunks in food products such as stews, pot pies, casseroles, canned foods, and pet food products.

Chunky meat products are highly desirable in human and pet foods, both for aesthetic quality and consumer appeal. These chunky products provide a more economical product that attempts to simulate natural meat chunks in shape, appearance and texture. It is highly desirable that these products retain their shape, appearance, and texture when subjected to commercial canning and retorting procedures.

Efforts directed to providing such simulated natural meat chunks have included producing such products from vegetable protein sources, using extrusion-expansion techniques. Such products have met with some acceptance in the food industry, but they have been limited primarily to use as meat extenders. Products produced using vegetable protein sources in an extrusion-expansion procedure lack the appearance and texture of natural meat and therefore are generally not suitable as full substitutes for meat.

Similarly, meat extrusion products, based on meat protein, produced by conventional procedures have not been entirely satisfactory. These products are in the form of a uniform, homogeneous mass, and lack the structure, texture, and appearance of natural meat chunks. Therefore, these products are not suitable for use in applications in which the use of simulated meat chunks is desired.

The meat emulsion product is in the form of distinct chunks or pieces having a plurality of juxtaposed, manually separable meat-like layers resembling a chunk of natural meat in appearance, texture, and consistency. The meat emulsion chunks are suitable for use as a partial or complete replacement for more expensive natural meat chunks in both human foods and animal foods. They retain their integrity and shape when subjected to commercial canning and sterilization procedures such as those required in the production of retorted, high moisture food products.

Conventional concentric tube heat exchangers comprise cooling systems that obstruct the flow of viscous and/or fibrous products through the exchanger. This obstruction may change the property of the product, cause equipment clogging and reduce output. Similarly, increasingly long tubes are required to cool the product as needed. However, using multiple tube heat exchangers lead to increased clogging, uneven flow and low throughput between the tubes.

SUMMARY OF THE INVENTION

The invention generally relates to devices such as heat exchangers for making meat emulsion products and methods of using the devices. In an embodiment, the invention provides a device comprising a first plate, a second plate attached to the first plate, and a first spacer and a second spacer arranged between the first plate and the second plate. The first plate, the second plate, the first spacer and the second spacer define at least one passage for a product to pass through the device. The first plate and/or the second plate comprise energy exchanging capabilities. For example, the first plate and/or the second plate can be constructed and arranged to heat or cool (e.g., via conduction or convection) the product in the passage.

In an embodiment, the first plate and the second plate define a temperature controlled zone. For example, the first plate and/or the second plate comprise a passage through a portion of the first plate and/or the second plate. The passage can comprise any suitable fluid that cools or heats the temperature controlled zone of the device.

In an embodiment, the first plate and the second plate define a plurality of temperature controlled zones. For example, the first plate and/or the second plate comprise a plurality of separate passages through individual portions of the first plate and/or the second plate. The passages can comprise a fluid that cools or heats the temperature controlled zones of the device.

In an embodiment, the passage comprises a gap between the first plate and the second plate ranging from about 3 mm to about 15 mm. The first spacer and the second spacer can be T-shaped. The first plate and the second plate can be sealed along the first spacer and the second spacer to withstand internal pressures in the passage from about 50 to about 1500 psi. The first plate and the second plate can be attached together by any suitable means such as, for example, one or more screws. In an embodiment, the device can comprise a first end plate defining an inlet and a second end plate defining an outlet that are attached to opposite ends of the first plate and the second plate.

In another embodiment, the invention provides a heat exchanger comprising a first pressure plate and a first energy exchanging plate attached to the first pressure plate, a second pressure plate and a second energy exchanging plate attached to the second pressure plate, the second pressure plate attached to the first pressure plate, and a first spacer and a second spacer arranged between the first energy exchanging plate and the second energy exchanging plate. The first energy exchanging plate, the second energy exchanging plate, the first spacer and the second spacer define at least one temperature controlled passage for product to pass through the heat exchanger.

In an embodiment, the first energy exchanging plate and/or the second energy exchanging plate comprises a passage through a portion of the first energy exchanging plate and/or the second energy exchanging plate. The passage can comprise any suitable fluid that cools or heats the temperature controlled zone of the heat exchanger.

In an embodiment, the first energy exchanging plate and the second energy exchanging plate define a plurality of temperature controlled zones. For example, the first energy exchanging plate and/or the second energy exchanging plate comprises a plurality of separate passages through individual portions of the first energy exchanging plate and/or the second energy exchanging plate that define the temperature controlled zones. The passages can comprise a fluid that cools or heats the temperature controlled zones of the heat exchanger.

In an embodiment, the passage comprises a gap between the first energy exchanging plate and the second energy exchanging plate ranging from about 3 mm to about 15 mm. The first spacer and the second spacer can be T-shaped. The first energy exchanging plate and the second energy exchanging plate can be sealed along the first spacer and the second spacer to withstand internal pressures in the product passage from about 50 to about 1500 psi.

In an embodiment, the heat exchanger further comprises a first end plate defining an inlet and a second end plate defining an outlet. The first end plate and the second end plate are attached to opposite ends of the first pressure plate and the second pressure plate. The heat exchanger can also comprise one or more transitioning gaskets attached to the inlet of the heat exchanger that transition from the opening of the inlet to the passage formed by the plates. The first pressure plate and the second pressure plate can be attached together by any suitable means such as, for example, one or more screws, bolts, or clamp screws.

In an alternative embodiment, the invention provides a method for making a food product. The method comprises introducing a food product into a heat exchanger and subjecting the product to a high pressure. The heat exchanger comprises a first plate, a second plate attached to the first plate, and a first spacer and a second spacer arranged between the first plate and the second plate. The first plate, the second plate, the first spacer and the second spacer define at least one temperature controlled passage for the food product to pass through the heat exchanger.

In an embodiment, the method comprises controlling a temperature of the heat exchanger by passing a fluid through at least one passage of a portion of at least one of the first plate and the second plate. For example, the first plate and the second plate can define a plurality of individual temperature controlled zones. The temperatures of individual temperature controlled zones can be controlled by passing a fluid through a plurality of separate passages through individual portions of the first plate and the second plate.

In yet another embodiment, the invention provides a method for making a meat emulsion product. The method comprises forming a meat emulsion containing protein and fat, comminuting and heating the meat emulsion, introducing the meat emulsion into a heat exchanger and subjecting the meat emulsion to a pressure of at least 70 psi. The heat exchanger comprises a first plate, a second plate attached to the first plate, and a first spacer and a second spacer arranged between the first plate and the second plate. The first plate, the second plate, the first spacer and the second spacer define at least one temperature controlled passage for the meat emulsion to pass through the heat exchanger. The heat emulsion is then discharged from the heat exchanger.

In an embodiment, the method can further comprise retorting the discharged meat emulsion product. In another embodiment, the method can further comprise drying or frying the discharged meat emulsion and forming a kibble-like piece from the meat emulsion.

An advantage of the invention is to provide an improved heat exchanger.

Another advantage of the invention is to provide an improved device for making a meat emulsion product.

Still another advantage of the invention is to provide an improved method of making a meat emulsion product.

Additional features and advantages are described herein, and will be apparent from, the following Detailed Description and the figures.

DETAILED DESCRIPTION

Figure 1:
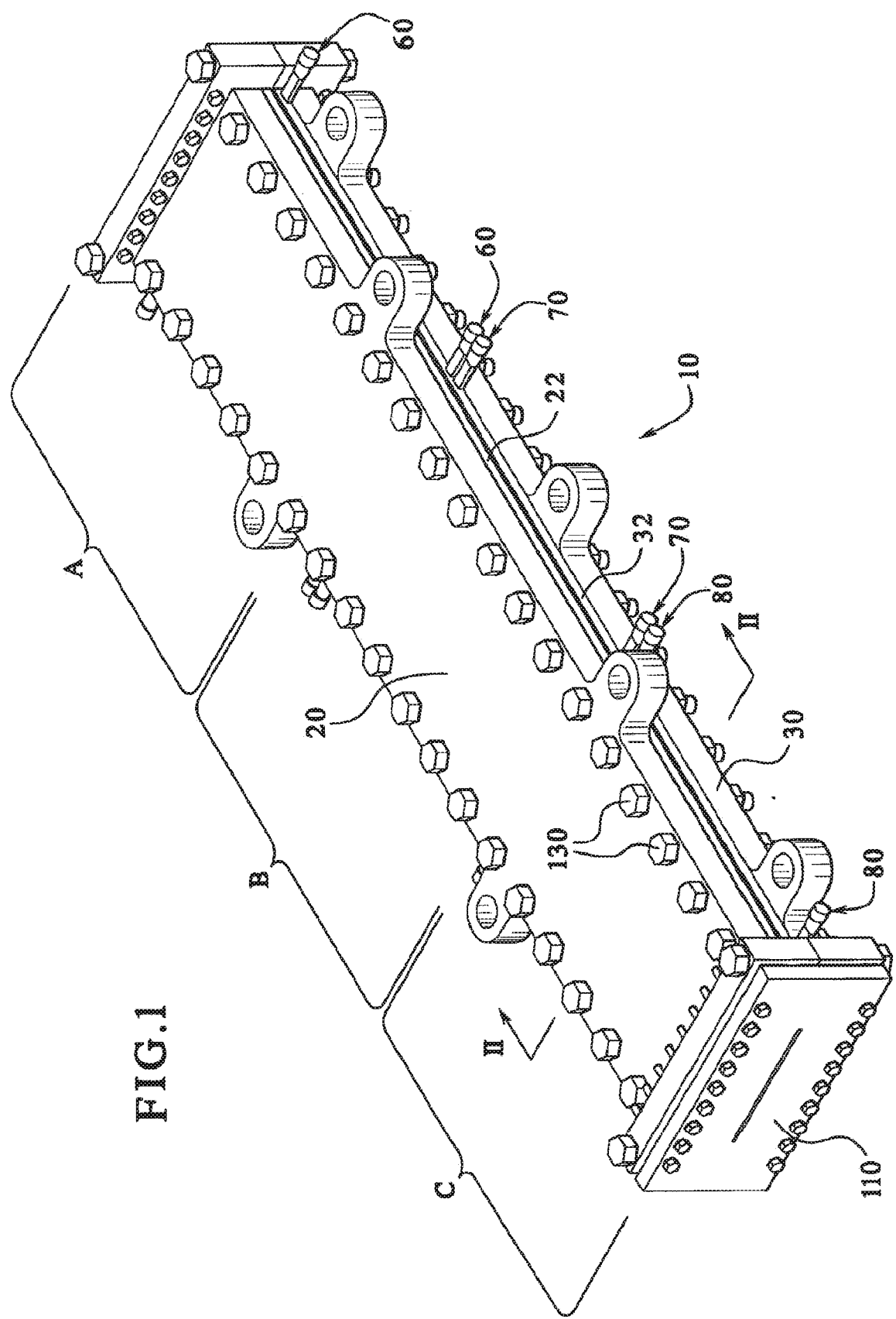
FIG. 1 illustrates a perspective view of the heat exchanger in an embodiment of the invention.

The invention provides methods and devices suitable for heating or cooling viscous materials. In one embodiment, the methods and devices are suitable for producing food products from meat emulsions. More specifically, in an embodiment, the invention provides a high pressure plate heat exchanger useful for making meat emulsion products. For example, the heat exchanger permits the use of higher pressures and an increased product throughput. In addition, the heat exchanger can be designed to minimize or avoid obstructing the product as it passes through, which eliminates or reduces clogging within the heat exchanger In a general embodiment illustrated in FIGS. 1-3, the invention provides a heat exchanger 10 comprising a first pressure plate 20 and a first energy exchanging plate 22 attached to the first pressure plate 20, a second pressure plate 30 and a second energy exchanging plate 32 attached to the second pressure plate 30, the second pressure plate attached to the first pressure plate. The heat exchanger 10 further comprises a first spacer 40 and a second spacer 42 arranged between the first energy exchanging plate 20 and the second energy exchanging plate 32. The first energy exchanging plate 22, the second energy exchanging plate 32, the first spacer 40 and the second spacer 42 define at least one temperature controlled passage 50 for product to pass through the heat exchanger 10.

The pressure plates 20 and 30, the energy exchanging plates 22 and 32 and the spacers 40 and 42 can be made out of any suitable material sufficient for their intended purposes. For example, the pressure plates 20 and 30 can comprise steel or other material capably to withstand the stresses related to elevated pressures and/or temperatures. The energy exchanging plates 22 and 32 can comprise steel or other material capably to withstand the stresses related to elevated pressures and/or temperatures. The spacers 40 and 42 can comprise steel or other material capably to withstand the stresses related to elevated pressures and/or temperatures.

In an embodiment, the first energy exchanging plate 22 and/or the second energy exchanging plate 32 comprises a passage 60 through any portion of the first energy exchanging plate 22 and/or the second energy exchanging plate 32. For example, the passage 60 can be constructed and arranged to pass through as much or as little of the energy exchanging plates as desired to affect temperature change of the plates. The passage 60 can also comprise an inlet and an outlet for fluid to pass through thereby facilitating heating or cooling of the product that is passing through the heat exchanger 10.

Any suitable fluid (e.g., water) or gas at any desired temperature that cools or heats the temperature controlled zone of the heat exchanger 10 can be used. By controlling the temperature of the first energy exchanging plate 22 and/or the second energy exchanging plate 32, the heat exchanger can cool or heat the product on one or both sides thereby increasing the efficiency of the heat or cooling exchange. Alternatively or in addition to, the first energy exchanging plate 22 and/or the second energy exchanging plate 32 can utilize any other suitable heating or cooling mechanisms know to the skilled artisan.

As illustrated in FIG. 1, the first energy exchanging plate 22 and the second energy exchanging plate 32 can also define a plurality of temperature controlled zones A-C. For example, the first energy exchanging plate 22 and/or the second energy exchanging plate 32 comprises a plurality of separate passages 60, 70 and 80 through individual portions of the first energy exchanging plate and/or the second energy exchanging plate that define the temperature controlled zones A-C. The passages 60, 70 and 80 can comprise a separate fluid or gas that cools or heats the temperature controlled zones A-C of the heat exchanger 10.

Each of the temperature controlled zones A-C can be kept at a specific temperature, for example, by controlling the temperature and flowrate of the individual fluid or gas through the passages 60, 70 and 80. The temperature zones can be designed to increase or decrease in temperature as the product is passed through the heat exchanger. For example, during cooling of the meat emulsion, the temperatures zones can be set to cool the food in succession from one zone to another through the heat exchanger. Although three temperature controlled zones are illustrated, it should be appreciated that the heat exchanger 10 can comprise any suitable number of temperature controlled zones in alternative embodiments of the invention. Moreover, two or more heat exchangers of the invention can be placed sequentially to offer additional heating or cooling zones as necessary.

Figure 2:
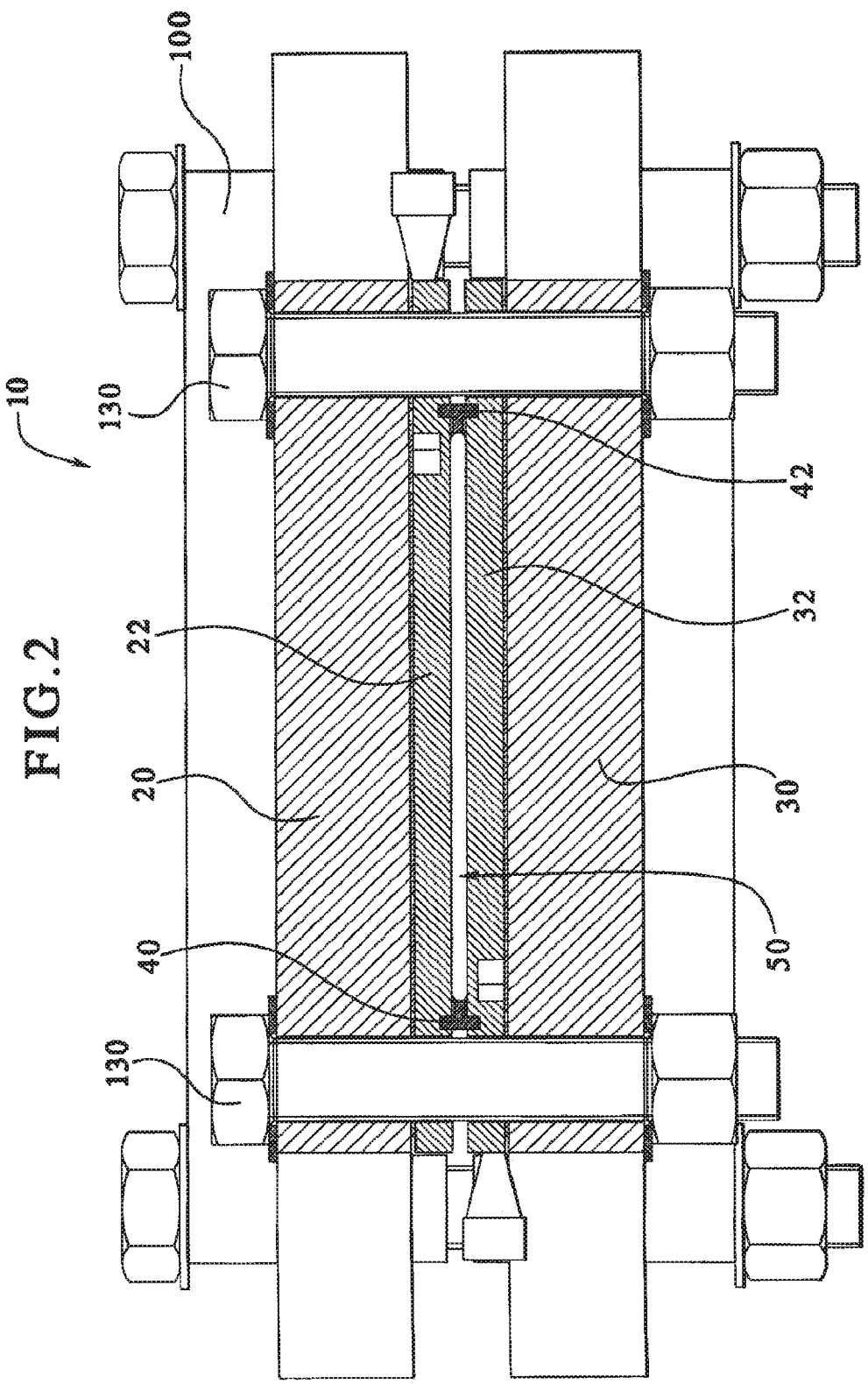
FIG. 2 illustrates a cross-section view II of the heat exchanger in FIG. 1.

As shown in FIG. 2, the passage 50 comprises a gap between the first energy exchanging plate 22 and the second energy exchanging plate 32. The gap can comprise any suitable height. In an embodiment, the gap comprises a height ranging from about 3 mm to about 15 mm. As further shown in FIG. 2, in an embodiment, the first spacer 40 and the second spacer 42 can be T-shaped. It should be appreciated the spacers can be any suitable shape, for example, to provide a passage between the first energy exchanging plate 20 and the second energy exchanging plate 32. For example, the distance between the energy exchanging plates 22 and 32 and therefore the size of the cooling/heating zones can be adjustable by modifying the size of the spacer 40 and 42.

Figure 3:
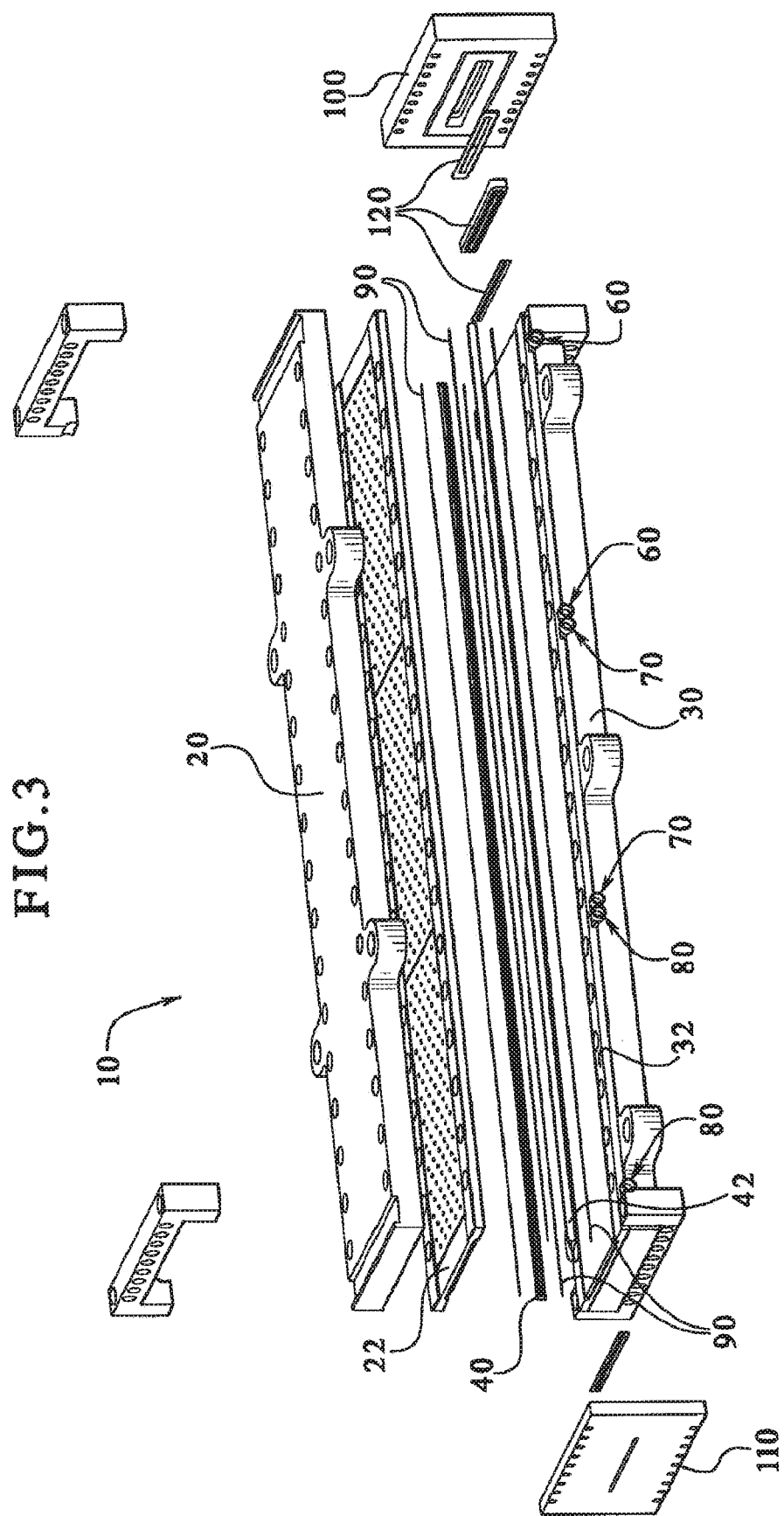
FIG. 3 illustrates an exploded view of the heat exchanger in an embodiment of the invention.

The first energy exchanging plate 22 and the second energy exchanging plate 32 can be sealed in any suitable manner along the first spacer and the second spacer to withstand pressures required to process the product as it passes through the device, e.g., from about 50 to about 1500 psi. This prevents the product in the passage from permeating the heat exchanger (e.g., from high internal pressures) as it passes through. For example, as shown in FIG. 3, in an embodiment, one or more long gaskets 90 can be placed along the spacers 40 and 42 to provide the seal. Preferably, the heat exchanger can be sealed to withstand positive pressures from about 50 to about 1500 psi and handle products with high viscosities e.g., 100,000 centipoises.

As illustrated in FIG. 3, in an embodiment, the heat exchanger 10 further comprises a first end plate 100 defining an inlet and a second end plate 110 defining an outlet. The first end plate 100 and the second end plate 110 can be attached to opposite ends of the first pressure plate 20 and the second pressure plate 30. The first end plate 100 and/or the second end plate 110 can also be used to attach two or more heat exchangers 10 together in a sequential fashion as discussed previously. For example, two or more heat exchangers can be brought together by attaching a first end plate of one heat exchanger to the second end plate of another heat exchanger.

The heat exchanger 10 can also comprise one or more transitioning gaskets 120 attached to the inlet of the heat exchanger 10 that transition from the opening of the inlet to the passage formed by the energy exchanging plates 22 and 32. The transiting gaskets 120 can provide, for example, a generally smooth transition (e.g., by decreasing in size of the opening) as the product enters the heat exchanger's temperature controlled zones from a previous device or pipeline.

The first pressure plate 20 and the second pressure plate 30 can be attached and held together by any suitable means and at any suitable location. For example, first pressure plate 20 and the second pressure plate 30 can be held together by one or more bolts, screws and/or clamps 130 that pass through portions of the plates as illustrated in FIGS. 1-2.

In an alternative embodiment, the invention provides a device comprising a first plate, a second plate attached to the first plate, and a first spacer and a second spacer arranged between the first plate and the second plate. The first plate, the second plate, the first spacer and the second spacer define at least one passage for a product to pass through the device. The first plate and the second plate can each function as energy exchanging plates and pressure plates.

In this embodiment, the first plate and the second plate define a temperature controlled zone. The first plate and/or the second plate also comprise energy exchanging capabilities. Accordingly, the first plate and/or the second plate can be constructed and arranged to transfer heat or cold (e.g., via conduction or convection) to or from the product in the passage. For example, the first plate and/or the second plate comprise a passage through any portion of the first plate and/or the second plate that a cooling or heating liquid passes through. Alternatively or in addition to, the first plate and/or the second plate can utilize any other suitable heating or cooling mechanisms know to the skilled artisan.

The first plate and the second plate can also define a plurality of temperature controlled zones utilizing a plurality of separate passages through individual portions of the first plate and/or the second plate. The passages can comprise any suitable fluid or gas that cools or heats the temperature controlled zones of the device.

The passage can comprise any size gap height between the first plate and the second plate such as, for example, ranging from about 3 mm to about 15 mm. The first spacer and the second spacer can be T-shaped. The first plate and the second plate can be sealed along the first spacer and the second spacer to withstand internal pressures in the passage from about 50 to about 1500 psi. The first plate and the second plate can be attached together by any suitable means such as, for example, one or more bolts, screws and/or clamps. In an embodiment, the device can comprise a first end plate defining an inlet and a second end plate defining an outlet that are attached to opposite ends of the first plate and the second plate.

In an alternative embodiment, the invention provides a method for making a food product. The method comprises introducing a meat emulsion into a heat exchanger and subjecting the meat emulsion to pressure. The heat exchanger comprises a first plate, a second plate attached to the first plate, and a first spacer and a second spacer arranged between the first plate and the second plate. The first plate, the second plate, the first spacer and the second spacer define at least one temperature controlled passage for the meat emulsion to pass through the heat exchanger.

The method can further comprise controlling a temperature of the heat exchanger by passing a fluid through at least one passage of a portion of at least one of the first plate and the second plate. For example, the first plate and the second plate can define a plurality of individual temperature controlled zones. The temperatures of individual temperature controlled zones can be controlled by passing a fluid through a plurality of separate passages through individual portions of the first plate and the second plate.

Figure 4:
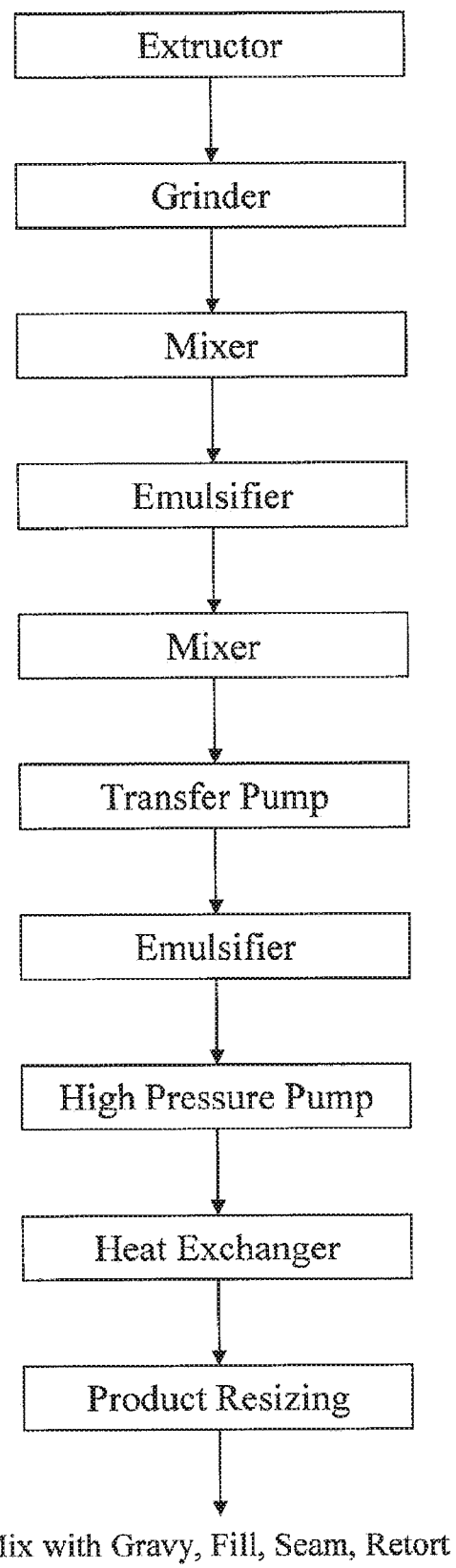
FIG. 4 is a schematic of a process for manufacturing meat emulsion products using the apparatus in an embodiment of the invention.

FIG. 4 sets forth a flow chart illustrating generally the process steps for making a meat emulsion product utilizing the heat exchanger in embodiments of the invention. In a general embodiment, the method comprises forming a meat emulsion containing protein and fat, comminuting and heating the meat emulsion, introducing the meat emulsion into a heat exchanger and subjecting the meat emulsion to a pressure of at least 50 psi. The heat exchanger comprises a first plate, a second plate attached to the first plate, and a first spacer and a second spacer arranged between the first plate and the second plate. The first plate, the second plate, the first spacer and the second spacer define at least one temperature controlled passage for the meat emulsion to pass through the heat exchanger. The heat emulsion is then discharged from the heat exchanger.

The method can further comprise packaging and retorting the discharged meat emulsion product. In another embodiment, the method can further comprise drying or frying the discharged meat emulsion and forming a kibble-like piece from the meat emulsion.

The heat exchanger can be applied in the production of any product utilizing a heat exchanger. Generally, any viscous material such as plastics, confectionaries, doughs, polymers, sludges, and pastes can be processed using the methods and devices of the invention. Preferably, the heat exchanger can be applied to production of food products and/or meat emulsion products for pet and human consumption. The meat emulsion products can simulate any type of meat products including vegetable protein, poultry, beef, pork, and fish.

As set forth in detail below, generally the meat emulsion products can be produced by emulsifying meat, protein, water and various ingredients. The emulsion so produced is then run through a high speed emulsion mill, wherein the emulsion is rapidly heated to cause it to gel thermally. The heated emulsion is then discharged into a heat exchanger in an embodiment of the invention in which it solidifies into a striated meat-like structure.

As is set forth in detail below, a meat emulsion product can be produced that has improved fiber definition (visible, small diameter fibers) that affords the product a very realistic meat-like image. In this regard, the resultant meat emulsion product has fiber bundles or strands that afford the meat emulsion a very realistic muscle meat appearance. It is believed that for a resultant poultry meat emulsion product that the product of the invention has the appearance of tender slow cooked chicken or turkey that has been hand-pulled from the bone and covered in its own broth/juice. Pursuant to the invention, additionally, a meat emulsion product is produced that has irregular product shape and dimensions, and has a stronger bite/mouth feel than prior art products and is not pasty, mushy or brittle.

In preparing a meat emulsion product according to a method of the invention, a mixture of natural meat materials, including meat from mammals, fish, or fowl and/or meat by-products, having the requisite quality, ingredient cost and palatability, is formulated, ground, and emulsified. The meat and/or meat by-products used may be selected from a wide range of components, with the type and amount of meat material used in the formulation depending on a number of considerations, such as the intended use of the product, the desired flavor of the product, palatability, cost, availability of ingredients, and the like. Both meat (i.e., skeletal tissue and non-skeletal muscle) from a variety of mammals, fowl and fish and/or meat by-products (i.e., the non-rendered clean parts, other than meat, derived from slaughtered mammals, fowl, or fish) may be used as the meat material. Thus, the term meat material as used herein is understood to refer to non-dehydrated meat and/or meat by-products, including frozen materials.

If the product is intended for human consumption, any of the meats and meat by-products used in the production of conventional meat emulsion products may be used in the invention, including meats such as whole-carcass beef and mutton, lean pork trim, beef shanks, veal, beef and pork cheek meat, and meat by-products such as lips, tripe, hearts, and tongues. If the product is intended for use as a pet food product, the meat mix may contain, in addition to the meat materials described above, any of the meat by-products which are approved for use in animal foods, such as mechanically deboned beef, chicken, or fish, beef and pork liver, lungs, kidney and the like. Typically the meat material is formulated to contain a maximum of about 15%, and preferably below about 10%, by weight of fat.

Additives which are used in conventional meat emulsion products may be mixed with the meat material and included in the meat emulsion of the invention. These additives include salt, spices, seasoning, sugar and the like in amounts sufficient to provide the product with desired taste characteristics. In addition, minor amounts of other dry ingredients such as, for example, functional ingredients, such as vitamins, antioxidants, prebiotics and minerals, flavors and the like, may also be added to the meat emulsion.

The meat emulsion may also include one or more dry proteinaceous materials, such for example, wheat gluten, soy flour, soy protein concentrate, soy protein isolate, egg albumin, and nonfat dry milk to improve emulsion stability and binding, impart flavor and reduce formulation costs. The inclusion of the dry proteinaceous materials in the meat emulsion is particularly advantageous in the production of product intended for use as a pet food. Dry proteinaceous material enables the processor to use meat materials having a protein to fat ratio and myosin to total protein ratio which would otherwise be of marginal acceptability for use in preparing meat emulsion products. If a dry, proteinaceous material is included in the meat emulsion, the amount used may vary from about 5% to about 35% by weight of the emulsion, depending on such factors as the intended use of the product, the quality of meat material used in the emulsion, ingredient cost considerations and the like. In a preferred embodiment, the level of dry proteinaceous material is between approximately 25 to about 35% by weight. Generally, as the fat content and/or moisture content of the meat material used are increased, the level of dry proteinaceous material in the emulsion is increased accordingly.

While the formulation of the meat emulsion may vary widely, the emulsion, including the dry proteinaceous material, should have a protein to fat ratio sufficient to form a firm meat emulsion product upon coagulation of the protein with no sign of emulsion instability. Further, the protein content of the emulsion must be such as will enable the emulsion, upon being heated to a temperature above the boiling point of water, to coagulate and form a firm emulsion product within a short period, that is, within about 5 minutes, and preferably within 3 minutes, after being heated to such a temperature. Thus, the meat materials and the additives, including the dry proteinaceous material (if used) are mixed together in proportions such that the meat material is present in an amount of from about 50% to 75% by weight, and preferably from about 60% to about 70% by weight of the meat emulsion. In a preferred embodiment, the starting ingredients for the meat emulsion comprise approximately 29 to about 31% by weight protein and approximately 4 to about 6% by weight fat. The resultant meat emulsion product should have a substantially similar profile to that of the starting ingredients. However, if gravy or broth is added to the product, this profile could change due to the moisture, protein and/or fat content of the gravy/broth.

In addition, the meat emulsion should be formulated to contain from about 45% to about 80% by weight moisture, with the moisture content preferably being controlled to from about 49% to about 53% by weight of the meat emulsion, i.e., the meat materials and additives. The exact concentration of water in the emulsion will, of course, depend on the amount of protein and fat in the emulsion.

The meat mix selected for use is passed through a grinder to reduce the meat material into pieces of substantially uniform size. Generally it is preferred to pass the meat through a grinder equipped with a 1 cm or smaller grinding plate. While satisfactory results may be obtained by grinding the meat to a particle size larger than 1 cm, the use of such larger meat particles is generally not preferred. If the meat materials to be used are in a frozen condition, they must first be pre-broken or cut into pieces to reduce the size of the pieces going into the grinder. While the size of the pieces will depend on the size of the meat grinder intake, normally the frozen meat material is cut into pieces about 10 cm square.

After grinding, the mix of meat particles is conveyed to a mixing tank in which the meat is mixed until uniform. It preferably is heated to a temperature of from about 1° C. to about 7° C., such as by hot water jacketing, steam injection, and the like to facilitate pumping of the meat mix. The uniform mix of ground meat particles is then comminuted under conditions that cause the meat material to emulsify and form a meat emulsion, in which the protein and water of the meat mixture form a matrix that encapsulates the fat globules. The meat material may be emulsified by any conventional procedure and equipment commonly used in meat emulsification, such as by using a mixer, blender, grinder, silent cutter chopper, emulsion mill and the like, which is capable of breaking up and dispersing the fat as globules in the protein slurry to form an emulsion.

Typically the temperature of the meat emulsion increases during the emulsification process. This heating of the meat emulsion is not objectionable as long as the temperature does not increase to the point that protein denaturation begins to occur at an undesirable rate at this stage of the process. The temperature of the meat mixture during emulsification should be maintained below about 49° C. to minimize protein denaturing at this stage of the process. According to a preferred embodiment of the disclosure, the meat material is passed through an emulsion mill to emulsify the meat material with the emulsion being heated to a temperature from about 10° C. to about 49° C., preferably from about 21° C. to about 38° C.

The additives to be incorporated in the meat emulsion, including dry proteinaceous material (if used), may be added to the meat mix prior to emulsification. Alternatively, it is frequently preferable to incorporate the additives, particularly the dry proteinaceous material, in the meat mix after emulsification of the meat. Since the addition of the dry proteinaceous material increases the viscosity of the emulsion, better emulsification is obtained when the meat mix is emulsified before the addition of the dry proteinaceous material, which results in the formation of a viscous meat "dough."

This meat emulsion dough can be comminuted in turn, so as to increase the fineness of the emulsion and is rapidly heated to a temperature above the boiling point of water. At this temperature, the coagulation of protein in the emulsion proceeds so rapidly that the emulsion is set and a firm emulsion product formed within a very short period, e.g., 20 seconds or less.

It has been found that rapidly heating the viscous meat emulsion to a temperature above the boiling point of water—generally from about 120° C. to about 163° C., and preferably from about 140° C. to about 154° C.—will result in the protein in the emulsion coagulating to set the emulsion and form a firm emulsion product within about 5 minutes and typically from a few seconds to about 3 minutes after heating. At this stage in the process, the emulsion is under a pressure of approximately 100 to about 500 psi and preferably 200 to 350 psi. The high temperature, along with increased pressures will provide fiber definition to the product. It has been surprisingly found that the higher the product temperature and pressure the better the fiber development. By this is meant linear alignment with smaller, finer, long fibers.

Preferably, the emulsion is processed in equipment wherein the emulsion is heated to such elevated temperatures while it is being comminuted such as by mechanical heating and/or steam injection. According to a preferred embodiment, the viscous meat emulsion, which is at a temperature of from about 30° C. to about 40° C., is pumped through an emulsion mill in which the meat emulsion is subjected to shearing to increase the fineness of the emulsion and almost simultaneously heat the emulsion to from about 120° C. to about 163° C., preferably 140° C. to about 154° C., through rapid mechanical heating and/or steam injection. Thus, the emulsion preferably is heated to such elevated temperatures in a period of less than about 60 seconds.

When the emulsion has been heated to such an elevated temperature in this manner, further significant shearing and cutting of the emulsion should be avoided. Control of the emulsion temperature within the desired range can be effected by adjusting such factors as the feed rate into the emulsion mill, the rotational speed of the emulsion mill and the like, and can readily be determined by those skilled in the art.

The hot meat emulsion, which is at a temperature above the boiling point of water and preferably in the range of from about 120° C. to about 163° C., preferably about 140° C. to about 154° C., is transferred with a positive displacement pump, e.g., a gear or lobe pump, to a heat exchanger in an embodiment of the invention. The product is pumped at high pressures of 80 psi to about 1500 psi, preferably about 150 psi to about 450 psi, and most preferably 200 psi to about 350 psi into the heat exchanger.

At such high pressures, the process operates at or close to the emulsifier upper design limit pressure. For this reason, preferably a positive displacement pump (pressure limit of 1500 to beyond 2500 psi.) is close-coupled directly after the emulsifier. This allows the use of the emulsifier to develop the high temperature without the high pressure. The pressure will be developed after the positive displacement pump. This thereby reduces the pressures in the emulsifier housing to 60 to 100 psi.

The emulsion is retained in the heat exchanger at a pressure above the vapor pressure of the emulsion until the protein in the meat emulsion has coagulated sufficiently to set the emulsion and form a firm emulsion product, which retains its shape and structure when discharged from the heat exchanger. At such elevated temperature, protein coagulation proceeds at a very rapid rate.

While the time required for the hot emulsion to set sufficiently to form a firm product will depend on a number of factors, such as the temperature to which the emulsion is heated and the amount and type of protein in the emulsion, a residence time of between a few seconds to about 3 minutes, and usually from about 1 to about 1.5 minutes, in the heat exchanger is generally sufficient for the protein to coagulate sufficiently and form a firm emulsion product which will retain its shape, integrity, and physical characteristics. The residence time in the heat exchanger can be controlled by adjusting the flow rate of the emulsion to the heat exchanger and/or by adjusting the length of the heat exchanger.

The structure and design of the heat exchanger in embodiments of the invention helps to create the fiber structure of the product. In addition, the flow rate and differing pressures on the product help create the fiber structure. Preferably the heat exchanger is cooled. This allows the product to be cooled as it is forced through the heat exchanger.

The heat exchanger in embodiments of the invention comprises preferred designs that facilitate efficient cooling or heating to the center of the product. The cooling increases process stability and, similar to a reduction in cross-sectional area, can enhance fiber definition and alignment by causing variations in the product viscosity and flow rate. The set meat emulsion pieces discharged from the heat exchanger are in the form of long strips of products having a temperature of about 65° C. to 100° C., and a moisture content of about 47% to 60%, with the pieces varying in size. Upon discharge from the heat exchanger, the pieces are rapidly cooled by evaporating cooling to a temperature in the range of 60° C. to 93° C. If desired, suitable cutting means, such as a rotary cut-off knife, a water jet knife, a knife grid, or the like may be mounted at the discharge end of the heat exchanger to cut the product into pieces of a desired size, e.g., from about 150 mm to about 350 mm. If desired, the product may be cut down the center to allow the product to cool more rapidly. The meat emulsion chunks thus formed have excellent integrity and strength and will retain their shape and fiber characteristics when subjected to commercial canning and retorting procedures such as those required in the production of canned foods having a high moisture content.

To enhance the fibrous image of the product, a set of compression rolls, which consists of two long lightly-textured cylinders (rolls) that spin at similar speeds, can be used prior to final product resizing or dicing. Product that is discharged from the heat exchanger is dropped into a narrow adjustable opening between the spinning cylinders, which open up, or partially separate or tear the fibers. It has been found that this incomplete form of shredding functions to emphasize the linear fibers.

The meat emulsion pieces discharged from the heat exchanger may be diced and conveyed to a dryer to remove a large portion of the moisture therefrom, and the dried product collected and stored. Moisture reduction may also be accomplished by exposing the pieces to dry heat, so that the resultant product pieces, although displaying fibers, have a generally kibble-like appearance. The dry heat may be provided by roasting, baking, grilling or frying the body. Preferably the body is flash fried. The duration would typically be less than one minute and preferably in the range from 15 to 35 seconds when the oil is in the temperature range from 150° C. to 200° C.

Alternatively, in producing a "wet" product, the meat emulsion pieces may be conveyed from the heat exchanger directly to a canning operation in which chunks are filled into cans together with other ingredients (e.g., sauce, gravy, and the like) and the cans retorted. In either situation, the product can be resized if desired.

By way of example, in the production of a canned pet food product, a suitable gravy may be prepared by heating a mixture of water, starch, and condiments. The meat emulsion chunks and gravy are filled into cans in the desired proportions, the cans are vacuum sealed and are then retorted under time-temperature conditions sufficient to effect commercial sterilization. Conventional retorting procedures may be used. Typically, a retorting temperature of about 118° C. to 121° C. for approximately 40 to 90 minutes is satisfactory in producing a commercially sterile product.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. A system for producing a food product, the system comprising:
    at least one component selected from the group consisting of (i) a grinder configured to process a starting material into pieces, (ii) a mixing tank configured to heat an intermediate composition, (iii) an emulsifier device configured to process the intermediate composition into an emulsion, (iv) a positive displacement pump configured to transfer the emulsion, or (v) a cutting device configured to cut the food product into pieces of a desired size;

wherein additionally to the at least one component, the system further comprises a heat exchanger indirectly or directly connected to the at least one component, the heat exchanger comprising (a) a first energy exchanging plate, (b) a second energy exchanging plate attached to the first energy exchanging plate, and (c) a first spacer and a second spacer arranged between the first energy exchanging plate and the second energy exchanging plate, wherein the first energy exchanging plate, the second energy exchanging plate, the first spacer and the second spacer define at least one temperature controlled passage for the food product to pass through the heat exchanger;

a first end plate defining an inlet into the at least one temperature controlled passage; and a second end plate defining an outlet from the at least one temperature controlled passage, wherein the first and second end plates are positioned perpendicular to the first energy exchanging plate and the second energy exchanging plate such that the inlet, the outlet and the at least one temperature controlled passage are positioned in the same plane.

2. The system of claim 1, wherein the first end plate is attached to a first end of the first energy exchanging plate and a first end of the second energy exchanging plate, the second end plate is attached to a second end of the first energy exchanging plate and a second end of the second energy exchanging plate, the second end of the first energy exchanging plate is an opposite end from the first end of the first energy exchanging plate, and the second end of the second energy exchanging plate is an opposite end from the first end of the second energy exchanging plate.

3. The system of claim 1, wherein at least one of the first energy exchanging plate or the second energy exchanging plate comprises a plurality of separate fluid passages through individual portions of the first energy exchanging plate or the second energy exchanging plate.

4. The system of claim 3, wherein the plurality of separate fluid passages contain a fluid that cools or heats temperature controlled zones of the heat exchanger.

5. A system for producing a food product, the system comprising:

at least one component selected from the group consisting of (i) a grinder configured to process a starting material into pieces, (ii) a mixing tank configured to heat an intermediate composition, (iii) an emulsifier device configured to process the intermediate composition into an emulsion, (iv) a positive displacement pump configured to transfer the emulsion, or (v) a cutting device configured to cut the food product into pieces of a desired size;

wherein additionally to the at least one component, the system further comprises a heat exchanger indirectly or directly connected to the at least one component, the heat exchanger comprising (a) a first pressure plate and a first energy exchanging plate attached to the first pressure plate, (b) a second pressure plate and a second energy exchanging plate attached to the second pressure plate, the second pressure plate attached to the first pressure plate, and (c) a first spacer and a second spacer arranged between the first energy exchanging plate and the second energy exchanging plate, wherein the first energy exchanging plate, the second energy exchanging plate, the first spacer and the second spacer define at least one temperature controlled passage for the food product to pass through the heat exchanger, wherein the heat exchanger further comprises:

a first end plate defining an inlet into the at least one temperature controlled passage; and a second end plate defining an outlet from the at least one temperature controlled passage, wherein the first and second end plates are positioned perpendicular to the first energy exchanging plate and the second energy exchanging plate such that the inlet, the outlet and the at least one temperature controlled passage are positioned in the same plane.

6. The system of claim 5, wherein the first end plate is attached to a first end of the first energy exchanging plate and a first end of the second energy exchanging plate, the second end plate is attached to a second end of the first energy exchanging plate and a second end of the second energy exchanging plate, the second end of the first energy exchanging plate is an opposite end from the first end of the first energy exchanging plate, and the second end of the second energy exchanging plate is an opposite end from the first end of the second energy exchanging plate.

7. The system of claim 5, wherein at least one of the first energy exchanging plate or the second energy exchanging plate comprises a plurality of separate fluid passages through individual portions of the first energy exchanging plate or the second energy exchanging plate.

8. The system of claim 7, wherein the plurality of separate fluid passages comprise a fluid that cools or heats temperature controlled zones of the device.

9. A system for producing a food product, the system comprising:

a grinder configured to process a meat material into pieces;

a mixing tank configured to receive the pieces of the meat material and form a meat mixture;

a first emulsifier device configured to comminute the meat mixture into a meat emulsion;

a positive displacement pump configured to transfer the meat emulsion;

a heat exchanger configured to receive the meat emulsion from the positive displacement pump and process the meat emulsion into the food product, the heat exchanger comprising (a) a first energy exchanging plate, (b) a second energy exchanging plate attached to the first energy exchanging plate, and (c) a first spacer and a second spacer arranged between the first energy exchanging plate and the second energy exchanging plate, wherein the first energy exchanging plate, the second energy exchanging plate, the first spacer and the second spacer define at least one temperature controlled passage for the food product to pass through the heat exchanger; and a cutting device configured to cut the food product into pieces of a desired size as the food product is discharged from the heat exchanger, wherein the heat exchanger further comprises:

a first end plate defining an inlet into the at least one temperature controlled passage; and a second end plate defining an outlet from the at least one temperature controlled passage, wherein the first and second end plates are positioned perpendicular to the first energy exchanging plate and the second energy exchanging plate such that the inlet, the outlet and the at least one temperature controlled passage are positioned in the same plane.

10. The system of claim 9, wherein the first end plate is attached to a first end of the first energy exchanging plate and a first end of the second energy exchanging plate, the second end plate is attached to a second end of the first energy exchanging plate and a second end of the second energy exchanging plate, the second end of the first energy exchanging plate is an opposite end from the first end of the first energy exchanging plate, and the second end of the second energy exchanging plate is an opposite end from the first end of the second energy exchanging plate.

11. The system of claim 9, wherein the mixing tank is configured to heat the mixture to a temperature of 1° C. to 7° C. using at least one of hot water jacketing or steam injection.

12. The system of claim 9, further comprising a second emulsifier device configured to comminute a meat dough comprising the meat emulsion, the meat dough further comprising dry proteinaceous materials added to the meat emulsion.

13. The system of claim 12, wherein the second emulsifier device is an emulsion mill configured to comminute the meat dough and heat the meat dough under a pressure from 100 to 500 psi.

14. The system of claim 12, wherein the positive displacement pump is coupled directly after the second emulsifier device.

\* \* \* \* \*